Patented Aug. 1, 1933

1,920,261

UNITED STATES PATENT OFFICE 1,920,261

STORAGE BATTERY VENTILATING PLUG

Robert A. Lavender, United States Navy

Application September 28, 1931
Serial No. 565,470

6 Claims. (Cl. 136—177.)

(Granted under the Act of March 3, 1883, as amended April 30, 1928; 370 O. G. 757)

This invention relates to storage battery filling and ventilating plugs and to plugs especially useful for large storage batteries such as are used in submarines or the like.

An object of this invention is to provide an improved filling and ventilating plug which will allow easy access to the battery for filling and inspection purposes and which will serve to condense the maximum amount of battery liquid to prevent its escape with the ventilated gases.

Another object of this invention is to provide a ventilating plug for a storage battery wherein the condensed battery liquids are diverted from the path of the ventilated gases and are returned to the battery cell with a minimum amount of re-exposure to the ventilated gases.

A further object of this invention is to provide improved baffle means for a ventilating plug which baffle means provides a maximum amount of exposure to the ventilating gases for condensing the escaping battery liquids and conduits these condensed liquids back to the battery cell without re-exposing them to the ventilating gases.

A further object of this invention is to provide a baffle means for a storage battery comprising spirally inclined baffles which will serve to direct the ventilating gases over a maximum amount of surface thereof to condense the battery liquids and conduct the condensed battery liquids to the battery cell without re-exposing them to the escaping battery gases.

A further object of this invention is to provide an improved battery filling and ventilating plug usable in the type of storage battery shown in the patent to Cook No. 1,527,426.

With the above and other objects in view, the invention consists in the construction, combination and arrangement of parts as will be described more fully hereinafter.

Reference is to be had to the accompanying drawing forming a part of this specification, in which like reference characters indicate corresponding parts throughout the several views, and in which.

Figure 1:
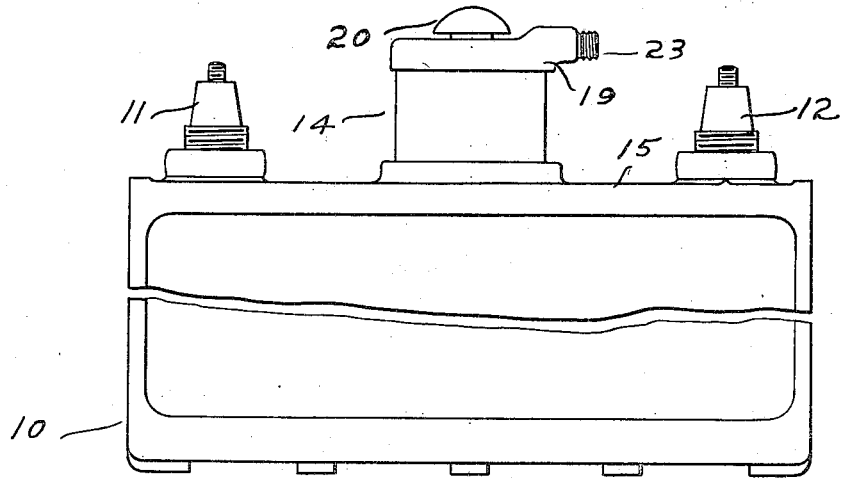
Fig. 1 is a view of the battery cell to which this invention has been applied.
Figure 2:
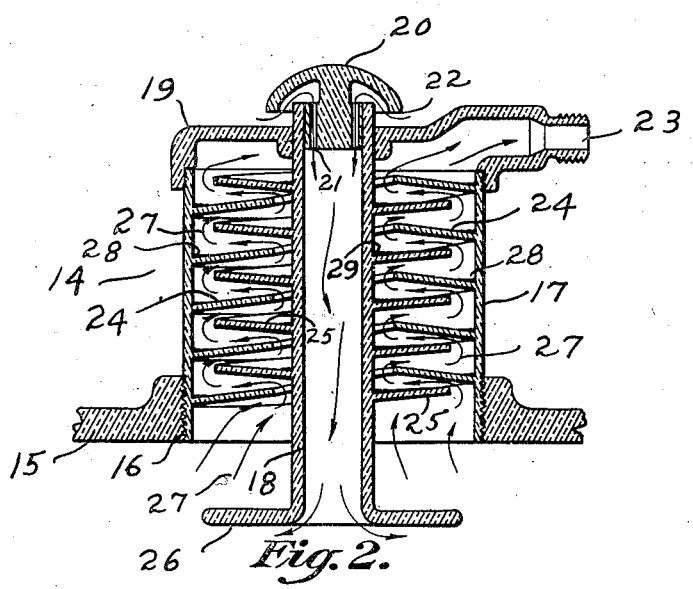
Fig. 2 is a cross sectional view through the improved filling and ventilating plug comprising this invention.

There is shown at 10 a storage battery cell having the conventional leads 11 and 12 and having a filling plug 14 located in the top thereof, this filling plug 14 being threaded into the battery top 15 at 16. The battery plug 14 is composed of an outer tube 17 and an inner tube 18, the tube 17 being screw-threaded into a dome 19 and the tube 18 being fitted into an opening in the top of the dome 19. The tube 18 is partly closed by a plug 20 having venting passages 21 protected from dust by depending flange 22 while the dome 19 has an air outlet 23 connected to a suitable air-pumping apparatus (not shown). Projecting inwardly from the outer tube 17 is a spiral, upwardly inclined baffle plate 24, this baffle plate 24 forming a continuous helical path. Projecting outwardly from tube 18 is an upwardly inclined spiral baffle plate 25 likewise forming a continuous helical path. It will be noted that the convolutions of both baffle plates 24 and 25 are so spaced as to permit the inter-threading of these plates and still allow a continuous passage space about the edges of the baffle plates.

In operation, the air is drawn into the battery through the passage 21 and through tube 18 over the battery cell plates and liquid, a flange 26 serving to divert the entering air over the battery liquid. The air gathers up with it the gases formed in the battery cell which it is desired to remove and unavoidably collects a certain amount of battery liquid. The air passes between the tubes 17 and 18 along the path of the arrows 27, passing between the edge of one baffle plate and the opposite tube, as shown. In following this tortuous path, the air is exposed to a maximum amount of surface of baffle plates 24 and 25, thus causing the condensable battery liquids carried thereby to condense along one of the surfaces of one of the baffle plates. As soon as liquid condenses on any surface of either of the baffle plates, it will tend to flow by gravity along said plate surface until it reaches the junction of said baffle plate and the tube, thus collecting into streams in the corner between the baffle plate and the tube as at 28 and 29.

It will be observed that these streams 28 and 29 are protected from the stream of air 27 because the stream of air 27 is being drawn upward against the bottom of the baffle plates, while the streams 28 and 29 are formed in the lower-most corner between the baffle plate and the tube. The streams 28 and 29 will then follow a downward, spiral path without being re-exposed to the stream 27 and without having to drip from plate to plate or from convolution to convolution across an opposed exhausting stream of air.

The battery liquid being thus recondensed is not again exposed to a liability of being picked up by the stream of air 27 and thus a maximum amount of battery liquid is condensed and conducted in protected streams to the bottom of the baffle plates, whence they drop back into the battery cell.

It will be understood that the above description and accompanying drawing comprehend only the general and preferred embodiment of my invention and that various changes in construction, proportion and arrangement of parts may be made within the scope of the appended claims without sacrificing any of the advantages of this invention.

The invention described herein may be manufactured and used by or for the Government of the United States of America for governmental purposes without the payment of any royalties thereon or therefor.

What I claim is:

1. A storage battery filling and ventilating plug comprising an outer tube and an inner tube spaced therefrom, a dome connecting said outer and inner tubes, said dome having an air passage leading to an air exhausting passage, baffle means in the space between the tubes comprising an inwardly and upwardly inclined spiral plate projecting from said outer tube and an outwardly and upwardly inclined spiral plate projecting from said inner tube and inter-threaded with said first-mentioned plate forming a tortuous air passage therebetween, said inner tube providing an entrance air passage to the battery.

2. A storage battery filling and ventilating plug comprising an inner tube and an outer tube having an air passage therebetween, and inter-threaded spiral baffle means projecting from said tubes and extending through said air passage, said spiral baffle means being placed at an acute angle to said tubes, said acute angle being on the upper surfaces of said baffle means.

3. A storage battery filling and ventilating plug comprising an inner tube and an outer tube having an air passage therebetween, and spiral baffle means extending through said air passage, said baffle means comprising a spiral plate projecting inwardly from said outer tube and a spiral plate projecting outwardly from said inner tube, said spiral baffle plates each projecting upwardly at an acute angle to their supporting tubes, said baffle plates being mutually inter-threaded.

4. A storage battery filling and ventilating plug comprising an inner tube and an outer tube having an air passage therebetween, and inter-threaded spiral baffle means projecting from said tubes and extending through said air passage.

5. A storage battery filling and ventilating plug comprising an inner tube and an outer tube having an air passage therebetween, and inter-threaded spiral baffle means extending through said air passage, said baffle means comprising a first spiral plate projecting inwardly from said outer tube and a second spiral plate projecting outwardly from said inner tube and inter-threaded with said first spiral plate.

6. A storage battery filling and ventilating plug comprising an inner tube and an outer tube having an air pasage therebetween, and a pair of inter-threaded spiral baffle plates projecting from said tubes and extending through said air passage, said spiral baffle plates being placed at an acute angle upwardly to said tubes and to each other.

ROBERT A. LAVENDER.